Patented June 13, 1933

1,914,351

UNITED STATES PATENT OFFICE

LLOYD A. HALL AND ENOCH L. GRIFFITH, OF CHICAGO, ILLINOIS, ASSIGNORS TO GRIFFITH LABORATORIES, INC., OF CHICAGO, ILLINOIS, A CORPORATION OF ILLINOIS

PROTECTIVE COATING

No Drawing.      Application filed July 16, 1930. Serial No. 468,445.

The present invention relates to the protective coatings, and particularly to coatings for the preservation of food stuffs, such as meats, and it is applicable also to fruits, vegetables, packaged foods, and other articles.

The problem of coating meats, in particular, and also other foods, has received much attention, owing to the increased severity in demands for sanitary products for storage, for shop display of products, and of the import and export trade calling for protection against severe changes in climatic conditions, exposure to flies, insects, and microorganisms, and other factors.

Paraffin has been proposed as a coating, but it has been found to be unsatisfactory. It is not entirely impervious to air, and is subject to breaking and cracking, in handling or transporting. It is also subject to crumbling and breaking away from the foods on cutting or slicing.

Although a large number of materials are available for coating foods, there are serious practical and governmental restrictions as to use of them.

We understand that gelatine has been proposed as a coating material for meats, and that so far it has never been developed into a practical and successful protecting agent. We have discovered a number of things about coating food stuffs and have been able to embody our discoveries in a gelatine base so as to apply the same successfully as a coating. Our invention and discoveries relate to a composition film having certain properties, to a modified film of gelatine, to a process of applying ordinary gelatine and a modified gelatine to build a laminated film, and to the products derived from that process.

As a result of our invention we are enabled to coat food-stuffs by a dipping process to form thereon a skin coating which is impervious to the atmosphere, which may be made as thick as desired to protect against flysting and maggot formation, which is tough, elastic and transparent, and which may be more horny on the outside than the inside. In addition, it is adherent to the food and does not loosen therefrom when the product is cut or sliced. Yet, in its preferred form, it is of such a character that it may be peeled from articles such as sausage, hams, bacon, etc., like a husk. The coating substance does not unite integrally with the food-stuffs, but clings to it without so much as forming an air space between the film and the article, in ordinary abusive commercial handling.

In general, the composition, which we have chosen as an illustration of the invention, has a gelatine base. In practical use our coating on food comprises one or more united layers of material formed by several successive applications by dipping and drying. The innermost coating which lies against the food must conform to legal restrictions and suitable materials such as pure food gelatine bases are used at this position. Other coatings may be of inferior grades of other material such as commercial gelatine.

Ordinarily, gelatine is a tough, rather brittle, transparent or translucent substance which may be dispersed in water as a colloid. It is reactive chemically, and is subject to numerous changes, such as hydrolysis. These chemical changes may be instituted by heating water solutions of gelatine with or without the presence of chemicals which may vary or regulate the reactions. Such chemical changes affect the coagulating or drying properties of gelatine solutions, determine the viscosity of gelatine solutions, and also determine the physical characteristics of the films formed from such solutions.

As a result of our studies we have found that in the method of preparing our gelatine solutions, the factors of time and temperature have a profound effect upon the excellence of the results obtained in practicing our invention. The illustrative examples hereinafter given are based upon the use of commercially available gelatines of the present day and, of course, the previous history of such gelatine is a factor somewhat determining the conditions which we select for the optimum results which we procure in using the invention as hereinafter described.

In preparing the composition which is applied in contact with food-stuffs we use pure food gelatine known as No. 1. For the purpose of securing the full benefits of our invention, we add to the gelatine, a hardening agent which renders the gelatine less, or not at all, dispersible in water after a film has been once formed from a gelatine solution containing the hardening agent. Numerous hardening agents for gelatine are known such as chromic acid, chromates, formaldehyde, various alums, etc., but where the composition is used adjacent food-stuffs, the list for selection becomes limited. We have chosen potassium alum as the preferred hardening agent. Alum is to some extent undesirable in connection with foods, but it is permitted in baking powders, and is more permissible in our coating for the reason that our coating may be readily husked from the article, and for the reason that there is little or no migration of alum from the composition into the food. The potash alum acts as an antibody, as a mild mould preventative, and antiseptic agent against microorganisms.

To secure the particularly desired qualities in the coating, such as elasticity, flexibility, adherence, and huskability, we add an emollient or tempering agent to the gelatine. Numerous gelatine emollients are known, such as sulphonated castor oil, but we prefer to use glycerine as an example of a harmless ingredient for contact with food-stuffs.

To prepare a suitable composition, we place 12 parts by weight of pure food gelatine No. 1 into 25 parts by weight of cold water with stirring for about five minutes to insure thorough mixture. This is allowed to stand without heating for about two hours. It is then heated, preferably by indirect heat, such as a water bath which should not exceed 200° F. in temperature, to effect solution in not more than one hour with a maximum temperature of 150° F. for the water and gelatine. We have found that excessive heating of the gelatine solution above 150° F. produces in the solution certain amino compounds, proteoses, and other proteins, and that the solution thereby loses its desired viscosity characteristics and solidification properties.

When the gelatine is entirely dissolved, as indicated by the clear transparent solution, 1.2 parts by weight of potash alum $(Al_2(SO_4)_3.K_2SO_4.24H_2O)$ is added and the heating continued for up to a half hour, near, or at, but preferably not over 150° F., during which time the desired free-flowing condition will be attained. During this period about 2.4 parts by weight of glycerine is thoroughly mixed into the solution.

The solution is then cooled to a temperature range of 135° F. to 140° F., and meat and other foods, packages or articles may be dipped therein, or the warm solution used as a coating agent by spraying or other means of application.

The coated articles are then hung in a warm room or in a warm air blast to effect a drying of the coat to a non-tackiness upon feeling with the fingers, which drying may take place in from a half hour to one hour. The coating at this point may be further dried but it is sufficiently dry for application of another coat of the same, but preferably of a different composition.

Having used a composition to produce a flexible elastic hardened gelatine base of pure quality next to the food, subsequent coats may be formed of other material, but preferably less pure material such as ordinary commercial grades of gelatine, not pure food gelatine. Compositions of such gelatine need not contain the alum nor the glycerine, nor their equivalents, but the preparation of the gelatine solutions for the subsequent dips is conducted with regard for maintaining the desired solution viscosity and solidification properties.

In the preferred embodiment of the invention, it is desired to have the outer coating more rigid than the inner coating.

As an example, we may take 9 parts by weight of any good variety of technical gelatine to 25 parts by weight of water, let the mixture stand cold from one half to one hour, heat to a temperature not over 150° F., (avoiding local overheating) until the gelatine is dissolved, cooling if necessary to 110° F. to 115° F. for the purpose of dipping or coating.

The first dipped articles may be subsequently dipped in the technical gelatine solutions and permitted to dry from 15 to 30 minutes, and may be redipped two or more times, with intervening drying periods of from 15 to 30 minutes. After final dipping, the article is allowed to hang at normal room temperatures in a room with low humidity until the coating is hard. One to two days may be necessary. The thickness of the film may be determined by the nature of the article and the conditions to which it will be exposed.

The resulting product, if a ham, butt, bacon, sausage, meat loaf, or the like, is visible through the coating, which appears only as a transparent glaze over the article. The coating is tough, hard, flexible and adherent, yielding fully with deformation of the article without separation therefrom. Several articles so coated may be placed together without any sticking of the coat of one to the coat of the other. The coating is air-exclusive, preserves the initial moisture content of the meat or food, sanitary, germ and mould proof, proof against fly-sting and entry of insects. Meats such as ham, pork, bacon, sausage and butts have been preserved for many months within such coatings in their original good condition.

The invention is particularly adaptable to protecting meats for shipment through the tropics, particularly hams, which are subject to a mould growth on such transportation. The invention is not limited to application direct to the surfaces of goods, but trade prejudices and demands may be met and the coatings applied over packaged goods such as cloth covered hams, wrapped dates, packaged raisins, prunes, oranges, bananas, apples, etc. Meat loafs may be directly protected by the composition without other retaining membrane.

Another advantage of our invention is the fact that it eliminates a practice of partially dehydrating meats, such as hams to a minimum moisture content, for certain shipping needs. The normal moisture content may be preserved.

In the preferred use of our invention, the skin coating is not a homogeneous one, but is a laminated structure comprising on the inner side an adherent, flexible, resilient, elastic coating, slightly antiseptic in quality, united to an outer coating of a different composition, preferably a more rigid gelatine base without modifying agents therein.

It will be understood that various modifications and changes may be made in practicing the present invention, that more of, or less than the given amounts of materials may be used, that different temperatures and time may be employed, and that the detailed disclosures herein given do not limit the invention short of its scope as expressed in the appended claims.

We claim:

1. A protected foodstuff comprising an article of food covered with an adherent dried envelope coating of gelatine base containing a hardening agent and an emollient, and an outer dried coating of gelatine base without emollient united to said adherent coating.

2. A protected foodstuff comprising an article of food covered with an adherent dried envelope coating of gelatine base containing a hardening agent and an emollient, and a gelatine base dried coating containing a hardening agent and no emollient united to the first coating.

3. The method of protecting food articles such as meats, fruits, and the like, which comprises dipping the article into a heated bath comprising a gelatine solution containing a hardening agent and an emollient, drying the coating to form a gelatine film, subsequently coating the article with an outer layer of gelatine solution which forms a less tempered coating, and drying the coated article.

4. The method of protecting articles of foodstuffs by a composition skin which comprises dipping the article into a gelatine solution of about 30% gelatine at about 135° to 140° F. which has not been heated to a temperature over 150° F. and which contains a hardening agent and an emollient, and dipping the coated article into a gelatine solution of about 27% at a temperature of about 110° F. to 115° F. which has not been heated to over 150° F. and drying the coating formed thereon.

5. The method of forming an adherent gelatine base coating on articles of foodstuffs which comprises first coating the article with a gelatine base solution capable of forming an enclosing envelope coating that will adhere removably to and flex with the article and anchor to itself a gelatine base coating of different composition, drying said solution to form a solid film enclosing the article, and then applying a gelatine base coating of different composition which rigidifies the united coatings as a removable husk.

6. An article of food having thereon a protective coating formed in situ which coating comprises a laminated structure of a film-like gelatine base composition formed as a skin upon the food product, the inner layer having yielding and adherent properties, whereby it clings to the article in deformation thereof, and the outer layer being united with the inner layer and having a harder and more rigid character.

7. An article of food having thereon a protective envelope coating formed in situ which coating comprises a transparent film formed on the article of food, said film comprising a plurality of gelatine base layers superimposed and united, the inner layer being tough, flexible, elastic and adherent to the article in ordinary deformation thereof, and at least one outer layer being more rigid.

8. An article of food having thereon a protective envelope coating formed in situ which coating comprises a film formed on the article of food in superimposed united layers, the outer layer being harder and more rigid than the inner layer, and the inner layer being flexible, elastic and adherent to the article whereby it anchors the film to the food during deformation of the article in normal commercial handling, and the outer layer being sufficiently rigid to enable the film to be peeled from the article like a husk.

In testimony whereof we have hereunto affixed our signatures.

LLOYD A. HALL.
ENOCH L. GRIFFITH.